United States Patent
Hicks

(10) Patent No.: US 11,609,711 B2
(45) Date of Patent: Mar. 21, 2023

(54) DISTRIBUTED CONTROL PATH

(71) Applicant: EMC IP Holding Company LLC, Hopkinton, MA (US)

(72) Inventor: Richard Hicks, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 17/226,131

(22) Filed: Apr. 9, 2021

(65) Prior Publication Data

US 2022/0326881 A1    Oct. 13, 2022

(51) Int. Cl.
*G06F 3/06* (2006.01)

(52) U.S. Cl.
CPC ............ *G06F 3/0659* (2013.01); *G06F 3/061* (2013.01); *G06F 3/0604* (2013.01); *G06F 3/067* (2013.01)

(58) Field of Classification Search
CPC ........ G06F 16/21; G06F 16/217; G06F 16/25; G06F 16/256; G06F 16/27; G06F 16/273; G06F 3/0659; G06F 3/0604; G06F 3/061; G06F 3/067
See application file for complete search history.

(56) References Cited

U.S. PATENT DOCUMENTS

| | | | |
|---|---|---|---|
| 7,987,152 B1 * | 7/2011 | Gadir | G06F 16/256 707/602 |
| 10,884,874 B1 * | 1/2021 | Chockalingam | G06F 16/256 |
| 2018/0074855 A1 * | 3/2018 | Kambatla | G06F 9/505 |

* cited by examiner

*Primary Examiner* — Idriss N Alrobaye
*Assistant Examiner* — Richard B Franklin
(74) *Attorney, Agent, or Firm* — Muirhead and Saturnelli, LLC

(57) ABSTRACT

Techniques for configuring and processing control path commands may include: partitioning control path components of a control path into a plurality of portions; performing first processing that configures a federation of a plurality of appliances, wherein each of the plurality of appliances includes a plurality of processing nodes, and wherein the first processing includes: for each of the plurality of appliances, configuring each of the plurality of processing nodes of said each appliance to run one portion of the plurality of portions of control path components; and selecting one of the plurality of appliances as a primary appliance of the federation; receiving a first management command at the primary appliance of the federation; and servicing the first management command by one or more of the plurality of appliances of the federation.

18 Claims, 7 Drawing Sheets

DISTRIBUTED CONTROL PATH

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for configuring and processing control path commands comprising: partitioning control path components of a control path into a plurality of portions; performing first processing that configures a federation of a plurality of appliances, wherein each of the plurality of appliances includes a plurality of processing nodes, and wherein the first processing includes: for each of the plurality of appliances, configuring each of the plurality of processing nodes of said each appliance to run one portion of the plurality of portions of control path components; and selecting one of the plurality of appliances as a primary appliance of the federation; receiving a first management command at the primary appliance of the federation; and servicing the first management command by one or more of the plurality of appliances of the federation. The first processing may include for each of the plurality of appliances, selecting one of the plurality of nodes of said each appliance as a primary node of said each appliance. Servicing the first management command may include the primary node of the primary appliance selecting the one or more of the plurality of appliances to service the first management command. Servicing the first management command may include the primary node of the primary appliance forwarding the first management command to the primary node of a first appliance of the plurality of appliances.

In at least one embodiment, the control path components may include a management database server that performs operations on a management database. Each of the plurality of appliances of the federation may include an instance of the management database server and a copy of the management database, wherein the copy of the management database on said primary appliance may be readable and writable. The instances of the management database server on the primary appliance may be in a primary mode, wherein the copy of the management database on every other appliance of the federation other than said primary appliance may be read only. For each of the plurality of appliances of the federation, the instance of the management database server is included in a first node of the plurality of nodes of said each appliance. For each of the plurality of appliances of the federation, the management database of said each appliance may be stored on physical storage devices accessible only to the plurality of nodes of said each appliance, and wherein the management database may be mounted on the first node of said each appliance and may be used by the instance of the management database server on the first node, to process management database requests. The first node may be the primary node of said each appliance.

In at least one embodiment, the control path components may include first one or more components that process a first set of management commands issued over the control path. Each management command of the first set may only read information from the management database. The control path components may include second one or more components that process a second set of management commands issued of the control path, wherein each management command of the second set may modify information of the management database. For each of the plurality of appliances in the federation, the first one or more components may be included on the first node of said each appliance, and wherein management commands of the first set may be serviced by said each appliance by issuing one or more queries to the management database server of the first node of said each appliance to retrieve data from the management database of said each appliance.

In at least one embodiment, for each of the plurality of appliances in the federation, the second one or more components may be included on a second node of the plurality of nodes of said each appliance, and wherein management commands of the second set may be serviced by said each appliance issuing one or more database commands to the management database server of the primary appliance. The one more database commands may modify content of the management database of the primary appliance. The first management command may be issued over the control path from a management application to the primary appliance of the federation. For each of the plurality of appliances of the federation, the copy of the management database of said each appliance may include data storage system configuration information of a data storage system. All management commands that are received by the primary appliance and require modification of at least some of the data storage system configuration information may be serviced using the copy of the management database on the primary server.

In at least one embodiment, the one or more of the plurality of appliances selected to service the first management command may include selecting a first of the plurality of appliances in accordance with a load balancing technique. The one or more of the plurality of appliances selected to service the first management command may include selecting a node of one of the appliances in accordance with a load balancing technique.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
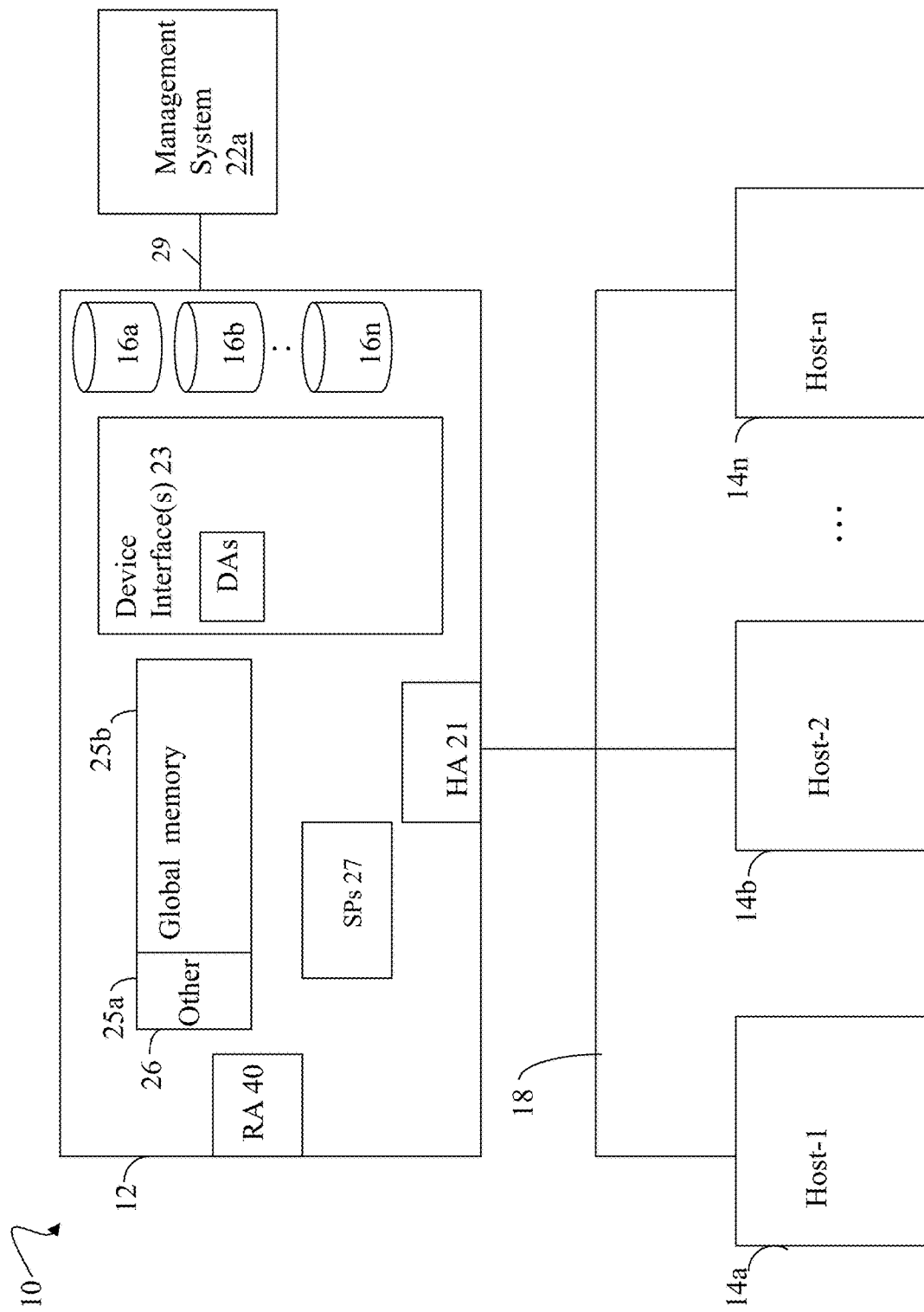
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database (also sometimes referred to herein as the management database). The data storage system configuration information stored in the database may generally describe the various physical and logical entities or managed objects in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different controllers or adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on the management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2A:
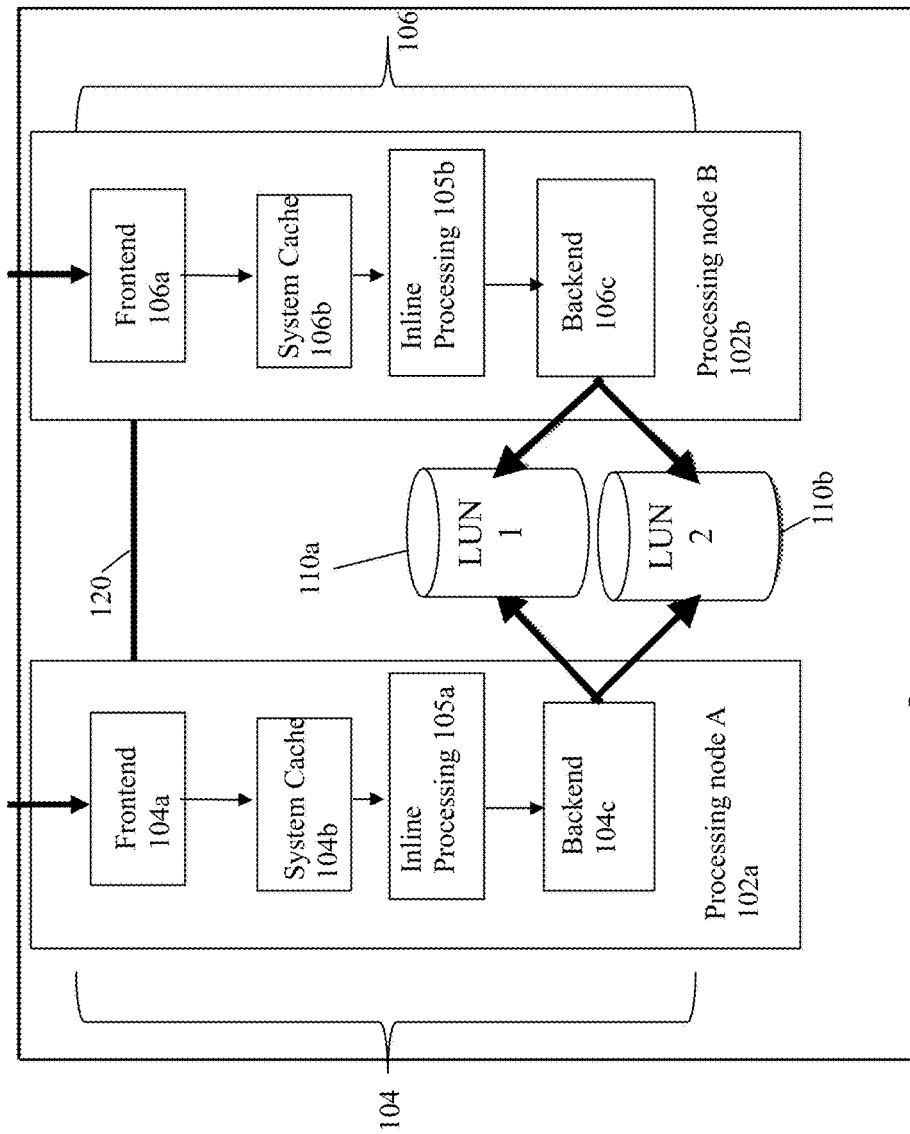
FIG. 2A is an example illustrating the I/O path or data path in connection with processing data in an embodiment in accordance with the techniques herein.

With reference to the FIG. 2A, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data deduplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/ processor cache) as well as other cache levels (e.g., the LLC) as described herein. Portions of the LLC may be used, for example, to initially cache write data which is then flushed to the backend physical storage such as BE PDs providing non-volatile storage. For example, in at least one embodiment, a RAM based memory may be one of the caching layers used as to cache the write data that is then flushed to the backend physical storage. When the processor performs processing, such as in connection with the inline processing

105*a*, 105*b* as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102*a-b* in the FIG. 2A. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102*a* is the peer node of the node B 102*b*, and the node B 102*b* is the peer node of the node A 102*a*.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path. Thus, in such an embodiment, different components, such as the FA, DA and the like of FIG. 1, may denote logical or functional components implemented by code executing on the one or more processors of each node. Each node of the pair may include its own resources such as its own local (i.e., used only by the node) resources such as local processor(s), local memory, and the like.

In at least one existing system, each dual node appliance has a management or control path that runs in a highly available (HA) active-passive configuration, where the management or control path stack is only deployed on to currently active or primary node. In case the primary node of the appliance becomes unavailable, the peer node is promoted to be the new primary, and the control or management stack fails over to that newly promoted primary node.

In such an existing system as noted above, system resources may be reserved each node of each appliance for use by the control path. For example, a number of CPU cores and a specified amount of memory local to each node of an appliance may be reserved for exclusive use by the control path components. In such a system having the active-passive configuration with a dual node appliance with only one active node with the control path stack, the resources of the passive peer node reserved exclusively for the control path remain idle. In this manner, reserved resources of the passive peer node marked for exclusive use by the control path components are not used, for example, by the data path. Thus only the control path system resources on the current primary node of each appliance are actively used while the remaining resources of the passive peer node are idle. The control path system resource usage based on the active-passive dual node configuration may be contrasted with, for example, the data path which may run in an active-active configuration actively and simultaneously using resources of both nodes in an appliance to process I/O operations.

In one aspect, the system resources of the passive node that are reserved for the control path and that remain idle or unused may be characterized as an inefficient use of system resources. Accordingly, described in the following paragraphs are techniques that provide for more efficient use of system resources in connection with the control path components.

The techniques described in the following paragraphs provide for partitioning the management or control path stack across both nodes of each appliance. In at least one embodiment, a first portion of the control path components and associated functionality may be configured to run on the first node of the appliance; and a second portion of the control path components and associated functionality may be configured to run on the second node of the appliance. In at least one embodiment, the first portion of control path components may be different from the second portion of control path components, whereby there is no overlap between components of the first and the second portions. The appliance may be configured to run the first portion of control path components on the first node at the same time the second node is configured to run the second portion of the control path components In this manner, the reserved control path resources of both nodes may be utilized to perform control path processing simultaneously. In this manner, the dual node appliance may be configured to service control path commands in an active-active configuration where control path processing is performed by both the primary node of an appliance and its peer node of the same appliance.

The foregoing and other aspects of the techniques herein are described in more detail in the following paragraphs.

Described in the following paragraphs are examples in which multiple appliances may be configured into a cluster or federation. For purposes of illustration, for example, 4 appliances are described in the cluster or federation, where each appliance is a dual node appliance as discussed above. More generally, the techniques herein may be used with a single node appliance, or a cluster or federation including any number of appliances each with any suitable number of nodes.

In at least one embodiment described in more detail below, for each dual node appliance, a single one of the nodes may be selected as the primary node with the remaining node designated as the non-primary peer node. For a single dual node appliance, when the primary node is unavailable, the other remaining peer node is promoted and becomes the newly designated primary node of the appliance.

In an embodiment with 4 appliances in a federation, a single one of the appliances of the federation may be designated as the primary appliance of the federation with the remaining 3 appliances of the federation designated as non-primary peer appliances. When the primary appliance becomes unavailable, another one of the non-primary peer appliances is promoted and becomes the newly designated primary appliance of the federation.

The primary appliance may be assigned a floating or assignable global management IP address that serves as the single point of management for the entire federation. The global management IP address may be reassigned, as needed, to the current designated primary appliance of the federation as other appliances may be promoted and become the designated primary appliance. The global management IP address may be exposed to control path clients, such as a data storage system management application or software, that may issue management or control path commands and requests. In this manner, such control or management commands and requests from the management application or software may be directed to the primary appliance. The primary appliance may then perform processing, as needed, to distribute and coordinate processing performed to service the management commands and requests. For example, multiple steps or tasks may be required to be completed in order to service a control path command. In this case, the primary appliance may distribute the steps or tasks, as appropriate, to one or more other appliances in order to implement and service the control path command. As another example, a particular control path command may be executed with respect to a particular storage object that is owned by or configured on a particular appliance. For example, a control path command may be to delete a volume or LUN that is currently provisioned from physical storage on one of the appliances. In this case, the primary appliance may route the control path command to delete the LUN to the particular one of the appliances that owns the LUN (e.g., where the LUN owned by the particular appliance is configured from physical storage of BE PDs accessible only by the particular appliance). Data storage system configuration information of the database (DB), also referred to herein as the management (MGT) DB, may be stored on the primary appliance, where the configuration information identifies, for example, the particular appliance that owns the LUN.

The primary appliance may host a centralized instance of the DB discussed elsewhere herein. Consistent with other discussion herein, the DB may generally store information regarding the data storage system configuration. The centralized instance of the MGT DB of the primary appliance may be accessed and used by all appliances of the federation when performing processing to service control path commands or requests. The centralized instance of the MGT DB of the primary appliance may be replicated in a synchronous manner to all other appliances of the federation. Thus, each non-primary peer appliance of the federation may have a copy of the MGT DB. In at least one embodiment, each copy of the MGT DB on a non-peer appliance may be characterized as a standby or passive copy of the MGT DB that may only be used when the non-peer appliance including the MGT DB is promoted to the primary appliance role. Put another, the MGT DB copy of the non-peer appliance may be characterized as a hot standby that will engage on demand to become the new centralized, primary or active instance of the MGT DB in response to the non-peer appliance being promoted to the primary appliance of the federation. In some embodiments, all management commands that may read and/or write information in the MGT DB may be serviced by all nodes using only the primary copy of the MGT DB on the primary appliance. In at least one alternate embodiment, the primary copy of the MGT DB may be read-able and write-able and used by all appliances when servicing all management commands that write or modify the MGT DB. In such an alternate embodiment, the copy of the MGT DB on each appliance may be read-only and may be used by each appliance to service management commands that only read information from the MGT DB. In this manner in the latter alternate embodiment, each of the appliances may service management commands that only read information from the MGT DB using the appliance's copy of the MGT DB and may service all management commands that write or modify information in the MGT DB using the primary or active copy of the MGT DB on the primary appliance of the federation.

In at least one embodiment, the MGT DB may be an SQL database, such as PostgreSQL, also known as Postgres, which is a free and open-source relational database management system emphasizing extensibility and SQL compliance. When implementing or servicing the management commands, data storage system configuration information as well as other information stored in the centralized, primary or active instance of the MGT DB on the primary appliance may be updated. For example, as each new LUN is created, one or more tables in the active instance of the MGT DB of the primary appliance are modified to reflect the newly created LUN. Subsequently, any modification to the primary instance of the MGT DB may then be replicated in a synchronous manner to the replicas or copies of the MGT DB on the non-primary peer appliances of the federation.

The MGT DB instance of each appliance may be configured and stored on physical storage of the BE PDs accessible only by that particular appliance. Additionally, each appliance of the federation may include an instance of a MGT DB server that accesses the data of the MGT DB of the appliance. The MGT DB server of each appliance may operate in either a primary or standby role. The MGT DB server of the primary appliance may operate in the primary role denoting the MGT DB of the primary appliance as the active or primary copy used in the federation. The MGT DB server of all other non-primary peer appliances may operate in the standby role denoting the MGT DB of the non-primary peer appliance as the standby or passive copy. In at least one embodiment, the MGT DB of an appliance may be mounted on only the primary node of the appliance. The MGT DB server may also be deployed on the primary node. Generally, the MGT DB of an appliance may be mounted and available for use in the standby mode on only a first node of the two nodes of the appliance. The MGT DB server may be included in, and execute on, the same first node upon which the MGT DB is mounted and available for use in the standby mode.

Each appliance includes a control path or management path instance, whereby each appliance may include all components or modules of the control or management path. The control path instance on each appliance depends on certain appliance-local resources, although the control path instance (e.g., modules or components of the control path) on each appliance may be managed at the federation level. For example as discussed elsewhere herein, each appliance uses its local storage of its BE PDs to store the appliance's MGT DB replica. However the MGT DB server of each appliance may be characterized as a federation-level resource of the control path, with one instance running on every appliance, in either a primary or standby role. Appliance-local resources, such as the MGT DB, may be managed on each appliance by a proprietary HA platform component, while federation-level control path resources may be managed by a federation or cluster HA component.

In at least one embodiment, the proprietary HA platform component of an appliance may include hardware and software used for appliance local inter-node communication and local resource management (LRM) within or local to the single appliance. For example, the proprietary HA platform component may include the interconnect 120 of FIG. 2A. Additionally, software on the nodes of the appliance may be used to manage the appliance local resources and for inter-node communications of the interconnect 120 to perform various tasks and processing that may vary with embodiment. For example, software on both nodes of the appliance may communicate over the interconnect 120 to maintain coherent copies of necessary information in local memories of both nodes. As another example, software on both nodes of the appliance may communicate over the interconnect 120 to determine which of the nodes is the primary node of the appliance and to detect when a primary node of the appliance is unavailable or has failed thereby indicating the remaining peer node is now the primary node. In following examples, such software on each of the nodes used for inter-node communication and local resource management within or local to the single appliance may be referred to as a local resource manager (LRM). Appliance local resources managed by the LRM instances on an appliance may include the copy of the MGT DB stored on the BE PDs of the appliance. In at least one embodiment, the copy of the MGT DB of an appliance may be mounted on only the primary node of the appliance.

In at least one embodiment, a local network such as a LAN may be used for inter-appliance communication. On the LAN, each of the nodes may have an IP address used for communicating between different nodes of different appliances.

In at least one embodiment, a federation or cluster HA component may include hardware and software used for inter-appliance communication and management of federation level resources. For example, the federation or cluster HA component may include a network such as LAN used for inter-appliance communication and resource management. The federation or cluster HA component may also include a federation resource manager (FRM) component on each node of each appliance of the cluster. In at least one embodiment, the FRM component of each node may be Pacemaker software, which is an open-source high availability resource manager software known in the art. The LAN included in the federation HA component may be used to internode communication among the different FRM instances of the nodes of the appliances of the federation such as, for example, for management of federation level resources and components. The components or modules of the control path instance on each appliance of the federation may be characterized as federation level resources that may be managed using FRM instances of the nodes. In at least one embodiment the control path components that are federation level resources controlled and managed by the FRMs of the appliances may include the MGT DB server instance on each appliance of the federation; one or more components or modules that process management commands, such as query commands, that only read information from the MGT DB; and one or more components or modules that process management commands that modify or write information stored in the MGT DB. In some cases, some of the management commands that modify or write information stored in the MGT DB may also result in reading information from the MGT DB. The federation level resources may also include the global management IP address discussed elsewhere herein, where the global management IP address is assigned to the current designated primary appliance of the federation.

Figure 2B:
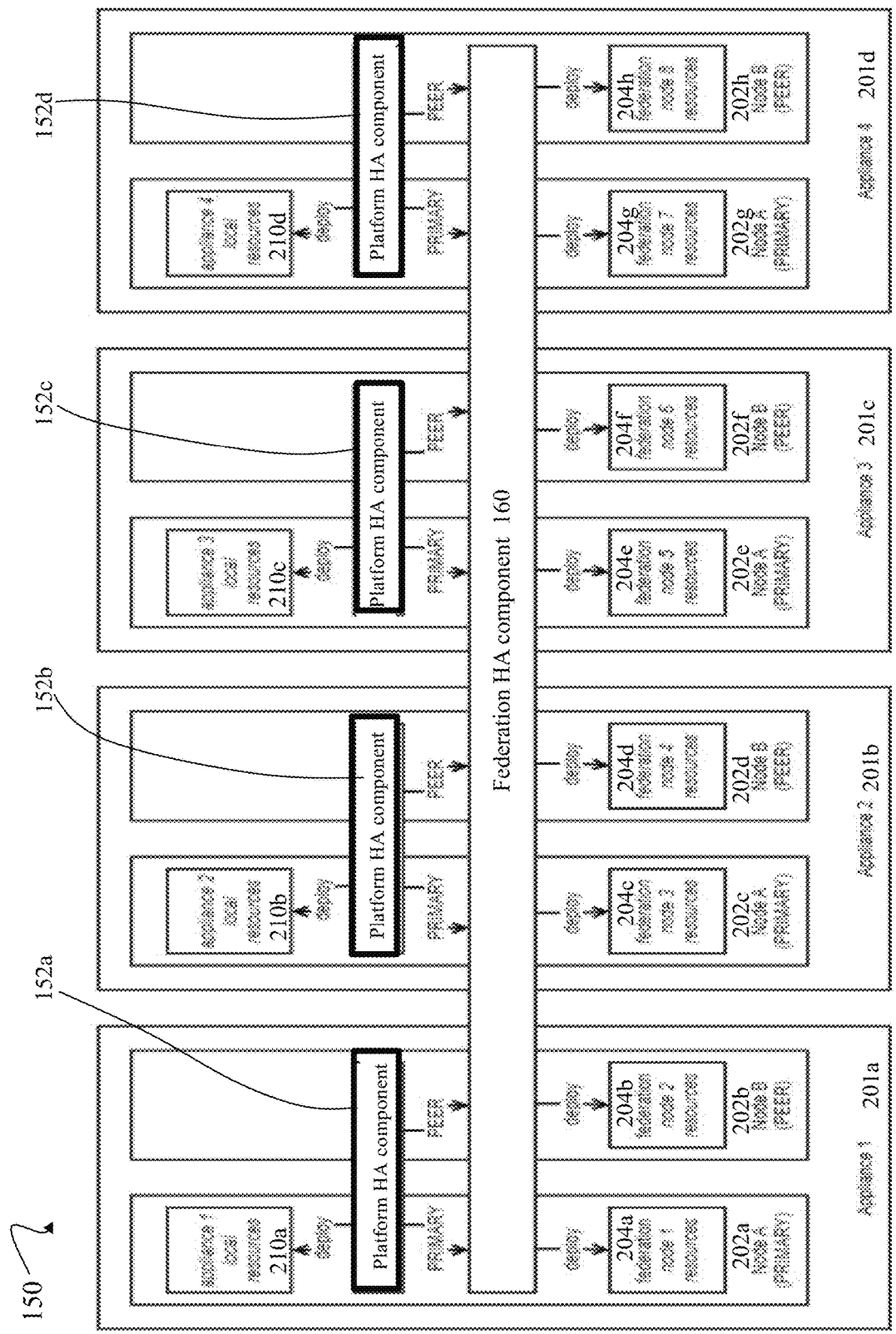
FIGS. 2B, 3, 4 and 5 are examples illustrating configurations of components in a federation in embodiments in accordance with the techniques herein.

Referring to FIG. 2B, shown is an example 150 of a federation of 4 dual node appliances in at least one embodiment in accordance with the techniques herein. The representation of the federation of FIG. 2B includes the platform HA components 152*a-d* and the federation HA component 160.

The example 200 includes appliances 201*a-d*. The appliance 201*a* may include primary node 202*a* and non-primary peer node 202*b*. The appliance 201*a* may include appliance local resources 210*a* deployed and configured by the platform HA component 152*a*. The platform HA component 152*a* may communicate the role of primary or non-primary peer of the nodes 202*a-b* to the federation HA component 160. The federation HA component 160 may deploy and configure the federation resources 204*a-b* respectively on the nodes 202*a-b*.

The appliance 201*b* may include primary node 202*c* and non-primary peer node 202*d*. The appliance 201*b* may include appliance local resources 210*b* deployed and configured by the platform HA component 152*b*. The platform HA component 152*b* may communicate the role of primary or non-primary peer of the nodes 202*c-d* to the federation HA component 160. The federation HA component 160 may deploy and configure the federation resources 204*c-d* respectively on the nodes 202*c-d*.

The appliance 201*c* may include primary node 202*e* and non-primary peer node 202*f.* The appliance 201*c* may include appliance local resources 210*c* deployed and configured by the platform HA component 152*c*. The platform HA component 152*c* may communicate the role of primary or non-primary peer of the nodes 202*e-f* to the federation HA component 160. The federation HA component 160 may deploy and configure the federation resources 204*e-f* respectively on the nodes 202*e-f.*

The appliance 201*d* may include primary node 202*g* and non-primary peer node 202*h*. The appliance 201*d* may include appliance local resources 210*d* deployed and configured by the platform HA component 152*d*. The platform HA component 152*d* may communicate the role of primary or non-primary peer of the nodes 202*g-h* to the federation HA component 160. The federation HA component 160 may deploy and configure the federation resources 204*g-h* respectively on the nodes 202*g-h*.

Figure 3:
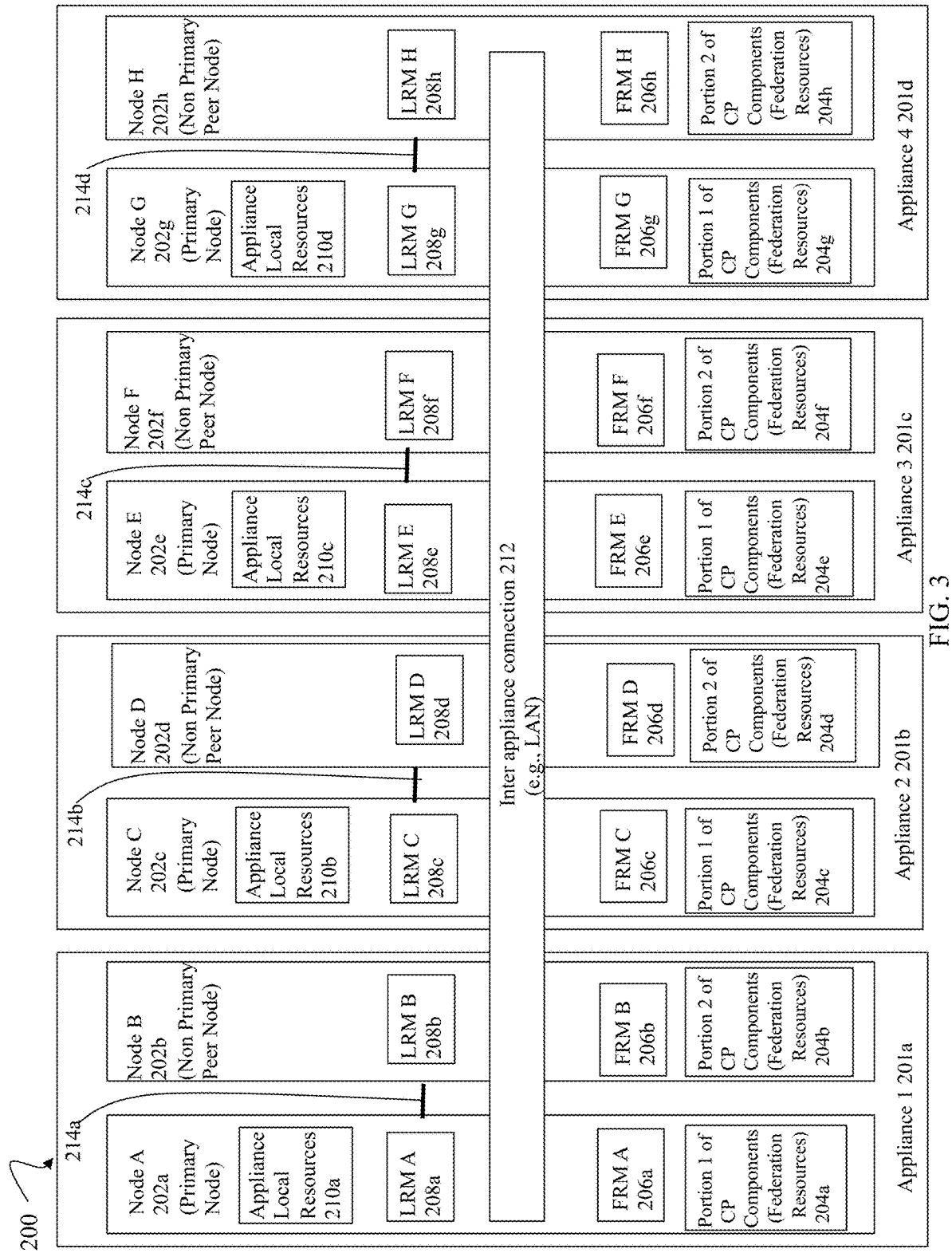

Referring to FIG. 3, shown is an example 200 of a federation of 4 dual node appliances in at least one embodiment in accordance with the techniques herein.

As noted above, the representation of the federation of FIG. 2B includes the platform HA components 152a-d and the federation HA component 160. In subsequent FIGS. 3, 4 and 5, alternative representations and more detailed components are provided for the components 152a-d, 160 and other elements.

The example 200 includes appliances 201a-d that may communicate with one another over the inter-appliance connection 212. The inter-appliance connection 212 may be, for example, a LAN or other local network connecting to the appliances 201a-d of the federation. Each of the appliances 201a-d may be dual node appliances as described elsewhere herein. The elements 214a-d may denote the internode communication connections, respectively, of the appliances 201a-d. Each of the elements 214a-d may correspond to an instance of the connection 120 of FIG. 2A.

The appliance 201a includes the nodes 202a-b. Generally, an instance or set of the control path (CP) components may be partitioned in any suitable manner and distributed among the nodes 202a-b of the appliance 201a. The node 202a includes the LRM A 208a, the appliance local resources 210a, the FRM A 206a, and a portion of the CP components 204a. The node 202b includes the LRM B 208b, and a portion of the CP components 204b. The node 202a may be the primary node of the appliance 201a and may include the appliance local resources 210a managed by the LRMs 208a-b, respectively, of the nodes 202a-b.

The appliance 201b includes the nodes 202c-d. Generally, an instance or set of the CP components may be partitioned in any suitable manner and distributed among the nodes 202c-d of the appliance 201b. The node 202c includes the LRM C 208c, the appliance local resources 210b, the FRM C 206c, and a portion of the CP components 204c. The node 202d includes the LRM D 208d, and a portion of the CP components 204d. The node 202c may be the primary node of the appliance 201b and may include the appliance local resources 210b managed by the LRMs 208c-d, respectively, of the nodes 202c-d.

The appliance 201c includes the nodes 202e-f. Generally, an instance or set of the CP components may be partitioned in any suitable manner and distributed among the nodes 202e-f of the appliance 201c. The node 202e includes the LRM E 208e, the appliance local resources 210c, the FRM E 206e, and a portion of the CP components 204e. The node 202f includes the LRM F 208f, and a portion of the CP components 204f. The node 202e may be the primary node of the appliance 201c and may include the appliance local resources 210c managed by the LRMs 208e-f, respectively, of the nodes 202e-f.

The appliance 201d includes the nodes 202g-h. Generally, an instance or set of the CP components may be partitioned in any suitable manner and distributed among the nodes 202g-h of the appliance 201d. The node 202g includes the LRM G 208g, the appliance local resources 210d, the FRM G 206g, and a portion of the CP components 204g. The node 202h includes the LRM H 208h, and a portion of the CP components 204h. The node 202g may be the primary node of the appliance 201d and may include the appliance local resources 210d managed by the LRMs 208g-h, respectively, of the nodes 202g-h.

Each of the nodes 202a-h of the appliances 201a-d may have its own IP address on the private LAN or inter-appliance connection 212. Thus, from a federation level view, there are 8 nodes 202a-h associated, respectively, with 8 IP addresses in the federation. In at least one embodiment, the 8 IP addresses of the nodes 202a-h may be characterized as local within the federation and are not externally exposed outside the federation. There may also be a floating or assignable appliance IP address for each of the appliances 201a-d, where the appliance IP address is bound or assigned to the current primary node of the appliance. If a peer node is promoted to the role as the primary node of an appliance, the appliance's IP address is also assigned to the promoted peer node. The floating or assignable appliance IP addresses for the appliances 201a-d may also be characterized as local within the federation and are not externally exposed outside the federation.

Generally, a point to note is that each of the appliances 201a-d may include an instance of the CP components or modules, where such CP components are modules may be distributed and partitioned in any suitable manner among the 2 nodes of each of the appliances 201a-d. In this example, the appliance local resources 210a-d may reside, respectively, on the primary node of each of the appliances 201a-d.

Consistent with other discussion herein, each of the appliances 201a-d has a designated primary node. In the event that the primary node of an appliance is unavailable, the other peer node of the appliance assume the role of the primary node. In the embodiment shown in FIG. 3, if the primary node fails or becomes unavailable, any functionality or CP services and processing performed by the failed or unavailable primary node are subsequently failed over to the other peer node. Thus there is a level of HA within each appliance via the failover node pair of each appliance. Additionally, there is second federation HA level whereby one of the appliances 201a-d of the federation is selected as the primary appliance. If the primary appliance fails or becomes unavailable, one of the other remaining non-primary peer appliances is selected to assume the role as the primary appliance of the federation. In this case, processing as described herein that is performed by the primary appliance is now assumed by the newly promoted primary appliance.

In this example 200, the appliance 201a may be the primary appliance of the federation. The global management IP address may be assigned to the primary appliance 201a. In this case, a management application (not shown) may be connected via another network or the internet to the federation 200 where the global management IP address is exposed to the management application as the target network address. The management application may issue management or CP commands over the CP to the primary appliance 201a. The primary appliance 201a serves as the single point of management for the entire federation. The primary appliance 201a may, for example, receive the CP or management commands from one or more management applications. For each CP or management command received, the primary appliance 201a may orchestrate processing among one or more of the federation nodes 202a-h to implement and service the management command. The primary appliance 201a may, for example, distribute processing for a received management command to another appliances of the federation based on domain object ownership. A management command may perform an operation on an object, such as a LUN, and domain object ownership may refer to the particular appliance that owns the object. With respect to a LUN, its storage may be provisioned from the BE PDs of one of the appliances 214a-d referred to as the owner of the LUN. Since the BE PDs of an appliance are an example of application local resources accessible only by the single appliance, at least some management commands with respect to a LUN may require processing that can only be performed by the owning appliance. For example, consider a management command or request to create a new LUN. The primary appliance 201a may receive the management command and then distribute and send the request to one of the other appliances, such as the appliance 201b. The appliance 201b may service the request by provisioning storage from its BE PDs for the new LUN. The appliance 201b may also write or update the configuration information of the federation as stored in the primary copy of the MGT DB of the primary appliance 201a. As discussed in more detail elsewhere herein, the primary copy of the MGT DB on the primary appliance 201a may be included, for example, in the appliance local resources 210a of the primary appliance 201a.

Figure 4:
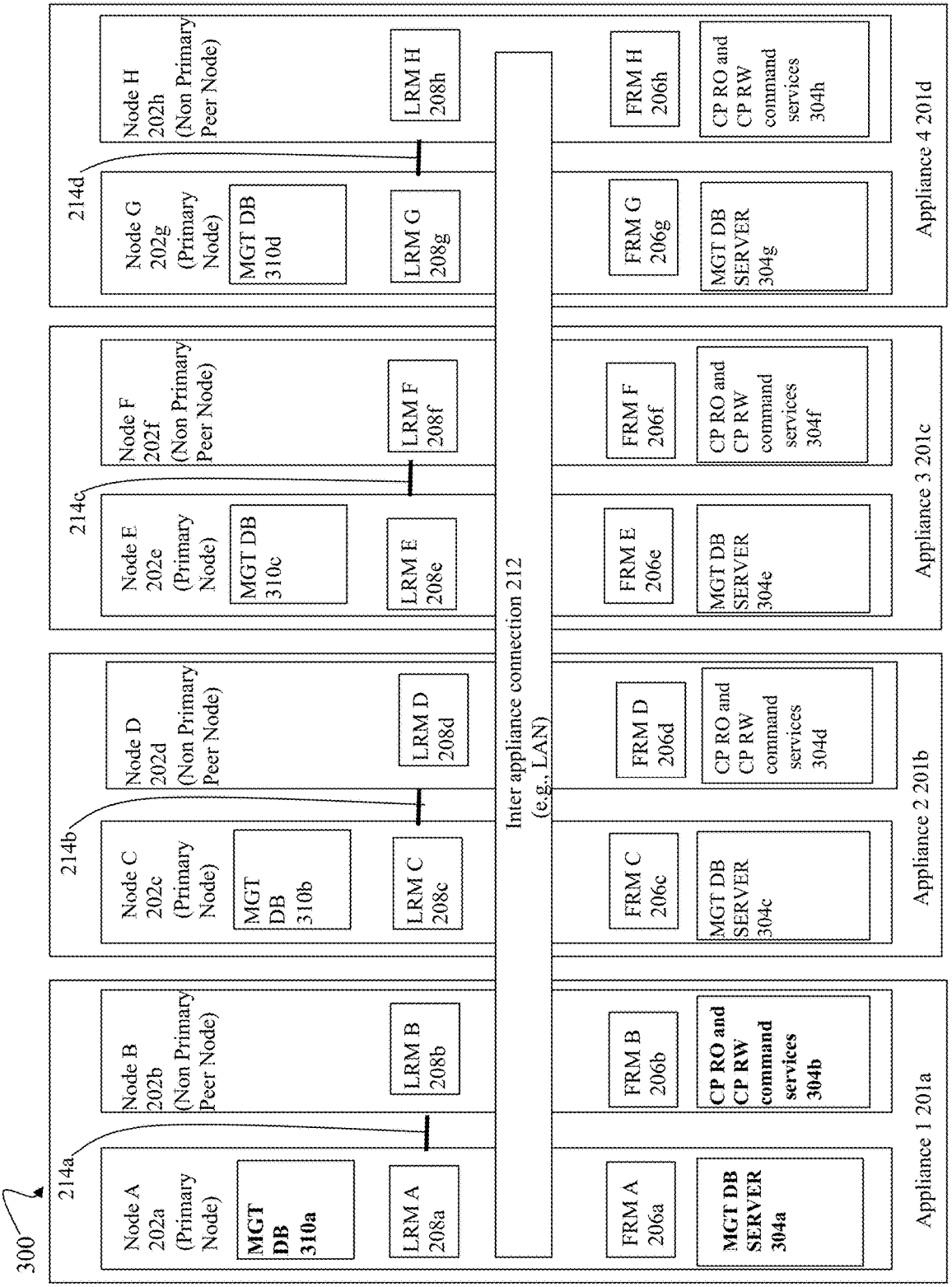

Referring to FIG. 4, shown is a more detailed example 300 illustrating the particular components distributed across the nodes of the appliances of a federation in at least one embodiment in accordance with the techniques herein.

The example 300 includes similarly numbered components as described in connection with the example 200 of FIG. 3. Additionally, the example 300 provides more detail regarding components or resources on the nodes 202a-h. As discussed below, the embodiment of FIG. 3 provides for splitting or partitioning the CP components across both nodes of the appliance where the MGT DB server is running on the primary node of the appliance while all CP services for all CP commands and queries run on the peer node of the appliance. Additionally, the MGT DB is also mounted on the primary node for use with the MGT DB server running on the primary node.

In the appliance 201a, the node 202a includes the MGT DB 310a which is an example of an appliance local resource 210a. The MGT DB 310a may be configured from physical storage of the BE PDs of the appliance 201a. The MGT DB 310a may be mounted and exposed or exported as a file system on the node 202a. The node 202a also run the MGT DB server 304a which is an example of a CP component and federation level resource 204a. Since the appliance 201a is the primary appliance of the federation, the MGT DB 310a is the primary or active DB of the federation. The MGT DB 310a may be a centralized instance of the MGT DB accessed by all the appliances 201a-d, and all the nodes 202a-h, for example, when servicing management commands. The MGT DB server 304a is also active and may issue DB commands to read from and/or write to the MGT DB 310a.

The node 202b includes the CP components 304b for all CP services such as, for example, the components to service RO (read only) management commands that only read data from the MGT DB 310a. The components denoted by 304b may also include components to service RW (read-write) management commands that may write as well as optionally read data from the MGT DB 310a. The element 304a of FIG. 4 may denote an example of CP components that are federation level resources represented by the element 204a of FIG. 3. The element 304b of FIG. 4 may denote an example of CP components that are federation level resources represented by the element 204b of FIG. 3. Thus, the elements 304a-b denote one way in which the CP components or federation level resources of the appliance 201a may be partitioned among the nodes 202a-b of the appliance 201a.

In the appliance 201b, the node 202c includes the MGT DB 310b which is an example of an appliance local resource 210b. The MGT DB 310b may be configured from physical storage of the BE PDs of the appliance 201b. The MGT DB 310b may be mounted and exposed or exported as a file system on the node 202b. The node 202c also runs the MGT DB server 304c which is an example of a CP component and federation level resource 204c. Since the appliance 201b is a peer or non-primary appliance of the federation, the MGT DB 310b is a replica and in this embodiment of FIG. 4 is not accessed for reading or writing unless and until the appliance 201b becomes the primary appliance of the federation. The MGT DB server 304c may be in the passive or standby mode. In this particular embodiment of FIG. 4, the elements 310b and 304c may remain in passive or standby mode and only used if the appliance 201b becomes the primary appliance of the federation. In this case, the promotion of the appliance 201b to the primary appliance also results in the MGT DB 310b assuming the role as described in connection with the MGT DB 310a when the appliance 201a is the primary appliance. In particular, in response to the appliance 201b becoming the primary appliance, the MGT DB 310b becomes the current centralized instance of the MGT DB accessed by all other nodes and appliances in the federation. Additionally, the MGT DB server 304c transitions from standby or passive to active or primary for use in issuing DB commands to the MGT DB 310b (now the active primary MGT DB used by all nodes and appliances of the federation).

The node 202d includes the CP components 304d for all CP services such as, for example, the components to service RO management commands that only read data from the MGT DB 310a. The components denoted by 304d may also include components to service RW management commands that may write as well as optionally read data from the MGT DB 310a. The element 304c of FIG. 4 may denote an example of CP components that are federation level resources represented by the element 204c of FIG. 3. The element 304d of FIG. 4 may denote an example of CP components that are federation level resources represented by the element 204d of FIG. 3. Thus, the elements 304c-d denote one way in which the CP components or federation level resources of the appliance 201b may be partitioned among the nodes 202c-d of the appliance 201b.

In the appliance 201c, the node 202e includes the MGT DB 310c which is an example of an appliance local resource 210c. The MGT DB 310c may be configured from physical storage of the BE PDs of the appliance 201c. The MGT DB 310c may be mounted and exposed or exported as a file system on the node 202c. The node 202e may also run the MGT DB server 304e which is an example of a CP component and federation level resource 204e. Since the appliance 201c is a peer or non-primary appliance of the federation, the MGT DB 310c is a replica and in this embodiment of FIG. 4 is not accessed for reading or writing unless and until the appliance 201c becomes the primary appliance of the federation. The MGT DB server 304e may be in the passive or standby mode. In this particular embodiment of FIG. 4, the elements 304e and 310c may remain in passive or standby mode and only used if the appliance 201c becomes the primary appliance of the federation. In this case, the promotion of the appliance 201c to the primary appliance also results in the MGT DB 310c assuming the role as described in connection with the MGT DB 310a when the appliance 201a is the primary appliance. In particular, in response to the appliance 201c becoming the primary appliance, the MGT DB 310c becomes the current centralized instance of the MGT DB accessed by all other nodes and appliances in the federation. Additionally, the MGT DB server 304e transitions from standby or passive to active or primary for use in issuing DB commands to the MGT DB 310c (now the active primary MGT DB used by all nodes and appliances of the federation).

The node 202f includes the CP components 304f for all CP services such as, for example, the components to service RO management commands that only read data from the MGT DB 310a. The components denoted by 304f may also include components to service RW management commands that may write as well as optionally read data from the MGT DB 310a. The element 304e of FIG. 4 may denote an example of CP components that are federation level resources represented by the element 204e of FIG. 3. The element 304f of FIG. 4 may denote an example of CP components that are federation level resources represented by the element 204f of FIG. 3. Thus, the elements 304e-f denote one way in which the CP components or federation level resources of the appliance 201c may be partitioned among the nodes 202e-f of the appliance 201c.

In the appliance 201d, the node 202g includes the MGT DB 310d which is an example of an appliance local resource 210d. The MGT DB 310d may be configured from physical storage of the BE PDs of the appliance 201d. The MGT DB 310d may be mounted and exposed or exported as a file system on the node 202g. The node 202g may also run the MGT DB server 304g which is an example of a CP component and federation level resource 204g. Since the appliance 201d is a peer or non-primary appliance of the federation, the MGT DB 310d is a replica and in this embodiment of FIG. 4 is not accessed for reading or writing unless and until the appliance 201d becomes the primary appliance of the federation. The MGT DB server 304g may be in the passive or standby mode. In this particular embodiment of FIG. 4, the elements 304g and 310d may remain in passive or standby mode and only used if the appliance 201d becomes the primary appliance of the federation. In this case, the promotion of the appliance 201d to the primary appliance also results in the MGT DB 310d assuming the role as described in connection with the MGT DB 310a when the appliance 201a is the primary appliance. In particular, in response to the appliance 201d becoming the primary appliance, the MGT DB 310d becomes the current centralized instance of the MGT DB accessed by all other nodes and appliances in the federation. Additionally, the MGT DB server 304g transitions from standby or passive to active or primary for use in issuing DB commands to the MGT DB 310d (now the active primary MGT DB used by all nodes and appliances of the federation).

The node 202h includes the CP components 304h for all CP services such as, for example, the components to service RO management commands that only read data from the MGT DB 310a. The components denoted by 304h may also include components to service RW management commands that may write as well as optionally read data from the MGT DB 310a. The element 304g of FIG. 4 may denote an example of CP components that are federation level resources represented by the element 204g of FIG. 3. The element 304h of FIG. 4 may denote an example of CP components that are federation level resources represented by the element 204h of FIG. 3. Thus, the elements 304g-h denote one way in which the CP components or federation level resources of the appliance 201d may be partitioned among the nodes 202g-h of the appliance 201d.

In the embodiment of FIG. 4, the primary MGT DB 310a of the primary appliance 201a may be the only MGT DB actively used in the federation in connection with servicing management or CP commands. Management or CP commands that write or modify the data storage system configuration result in modifying the MGT DB 310a of the primary appliance 201a where such writes or modifications are then synchronously replicated to the replicas or copies 310b-d of the respective peer appliances 201b-d. Consistent with other discussion herein, the replicas or copies 310b-d of the MGT DB on the peer appliances 201b-d may be characterized as "hot" standbys allowing any appliance to be promoted to the primary appliance role on demand. In the embodiment of FIG. 4, the primary or active MGT DB 310a is accessed and used by all appliances 201a-d when reading and/or writing data storage system configuration for the CP or management command servicing. The replicas or copies 310b-d of the MGT DB that are in passive or standby mode are not accessed for reading or writing in connection with servicing CP or management commands by the appliances 201b-d.

As an example illustrating processing flow, assume a management or CP command is received by the primary appliance 201a, where the primary appliance 201a distributes the management command to another peer appliance, such as the appliance 201b, for processing. Assume, for example, that the management command is requesting information, such as a list of LUNs, to be displayed on the GUI of a management application. The primary node of the primary appliance 201a may receive the management command. The FRM 206a of the primary node 202a of appliance 201a may then forward the management command to the FRM 206d of the peer appliance 201b for servicing. To service the management command querying for a list of LUNs, the FRM 206 of the non-primary peer node 202d of the appliance 201b may issue a query request over the LAN (inter-appliance connection) 212 to query the primary or active MGT DB 310a of the primary appliance 201a for the list of LUNs to be returned to the appliance 201b. In particular the FRM 206d of the non-primary peer node 202d of the appliance 201b may issue the query request to the primary node 202a of the primary appliance 201a. The MGT DB server 304a of the primary node 202a of the appliance 201a queries the primary MGT DB 310a and returns the query results to the FRM 206d of the non-primary peer node 202d of the appliance 201b. In response, the appliance 201b then returns the requested information (e.g., the list of LUNs) to the primary node 202a of the primary appliance 201a to be returned to the GUI client of the management application.

The configuration of FIG. 4 described above has, for each appliance, the MGT DB server running on the primary node, while the CP or management services (e.g., including command and query processing) run on the peer node. This configuration model allows the CP services to run on the peer node of each appliance without direct contention with the MGT DB server (and vice-versa) for the same CPU and memory resources of the same node.

As a variation of the embodiment of FIG. 4, assume that primary MGT DB 310a of the primary appliance 201a is readable and writeable as described above but that each of the replicas or copies 310b-d of the MGT DB are read only and may be used for servicing management or CP requests which only read information from the MGT DB. Thus, in this variation of the embodiment of FIG. 4, each appliance may process CP or management commands whereby if the commands only read information from the MGT DB, the appliance uses its appliance local read-only replica of the MGT DB to service the command. Otherwise, if the commands write or modify information in the MGT DB, the appliance issues the appropriate requests and uses the primary MGT DB 310a (that is readable and writeable) of the primary appliance 201a to service the command.

In connection with the embodiment of FIGS. 3 and 4, the primary appliance 201a may use any suitable technique to select one or more of the appliances 201a-d of the federation to service the management or CP command. As discussed elsewhere herein, management commands may be routed to particular appliances based on object domain ownership. Other management commands may generally be serviced by any of the appliances 201a-d. For such commands, the primary appliance may select one of the appliances 201a-d to service the management or CP command using any suitable technique. In at least one embodiment, a load balancing technique may be used to select one of the appliances 201a-d to service the management or CP command. For example, a round robin technique may be used where all appliances in the federation may be equally weighted for selection in some rational order. Each of the non-primary peer appliances may be selected based on a sequential ordering or list of the non-primary peer appliances, where the appliances are selected by sequentially traversing the list from top to bottom and then starting again at the top of the list.

As another option, an embodiment may use a load balancing technique that selects a particular one of the appliances 201a-d to service a management or CP command, where the selected appliance has the minimum relative workload of all the appliances 201a-d. Any suitable one or more workload metrics based on current levels or resource consumption may be used. For example, an embodiment may select an appliance based on the CPU utilization and/or memory utilization of each appliance. The appliance having the minimum utilization level of the CPU and/or memory may be selected to service the management or CP command. In at least one embodiment using CPU utilization, the CPU utilization metric may be a percentage denoting the percentage of the time the CPU is not idle. In at least one embodiment using memory utilization, the memory utilization metric may be a percentage denoting the amount of memory consumed at a point in time with respect to the total amount of memory in the appliance or nodes of the appliance.

Additionally, other configurations in accordance with the techniques herein may use a more fine-grained partitioning of the CP components between nodes of each appliance. In this manner, the management or CP may be configured in a more fine-grained active-active architecture with the CP components and services distributed across both nodes of the appliances of the federation to further optimized load balancing and scalability.

Figure 5:
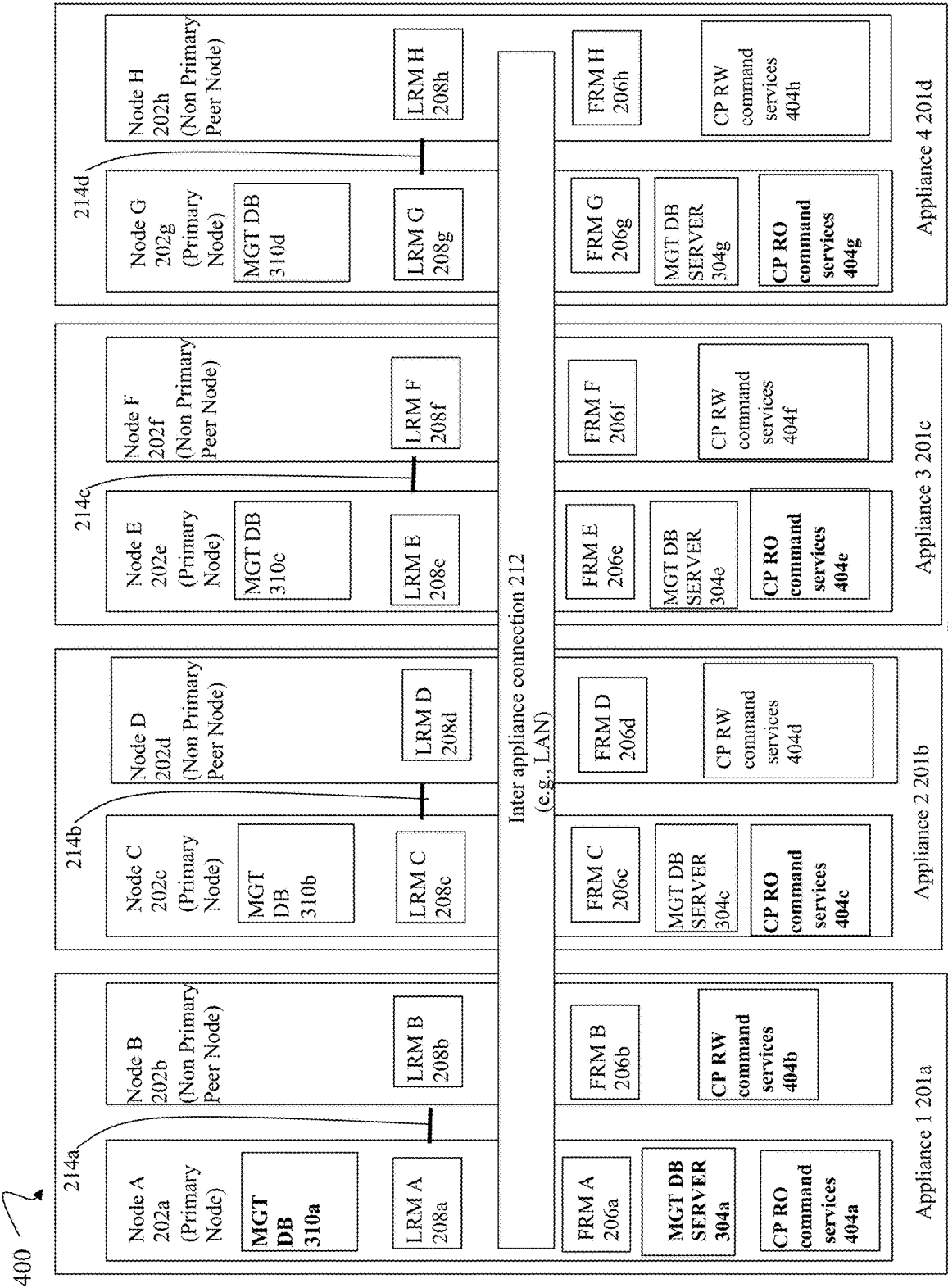

What will now be described in connection with FIG. 5 is another more detailed example 400 illustrating the particular components distributed across the nodes of the appliances of a federation in at least one embodiment in accordance with the techniques herein. The components of FIG. 5 includes similarly numbered components as described in connection with FIG. 4. Additionally, FIG. 5 includes a further refinement in the partitioning of the CP components and services in comparison to the embodiment of FIG. 4.

In particular, the CP services included in each peer node of an appliance may be further partitioned so that the CP RO command services run on the primary node of the appliance and the CP RW command services run on the peer node of the appliance. For example, the appliance 201a of FIG. 4 includes the CP services 304b which are further partitioned in the embodiment of FIG. 5 into the CP RO command services 404a and the CP RW command services 404b. The CP RO command services 404a run on the primary node 202a and the CP RW command services 404b run on the peer node 202b.

The appliance 201b of FIG. 4 includes the CP services 304d which are further partitioned in the embodiment of FIG. 5 into the CP RO command services 404c and the CP RW command services 404c. The CP RO command services 404c run on the primary node 202c and the CP RW command services 404d run on the peer node 202d.

The appliance 201c of FIG. 4 includes the CP services 304f which are further partitioned in the embodiment of FIG. 5 into the CP RO command services 404e and the CP RW command services 404f. The CP RO command services 404e run on the primary node 202e and the CP RW command services 404f run on the peer node 202f.

The appliance 201d of FIG. 4 includes the CP services 304h which are further partitioned in the embodiment of FIG. 5 into the CP RO command services 404g and the CP RW command services 404h. The CP RO command services 404g run on the primary node 202g and the CP RW command services 404h run on the peer node 202h.

Additionally, in the embodiment of FIG. 5, assume that MGT DB 310a of the primary appliance 201a is readable and writeable but that each of the replicas or copies 310b-d of the MGT DB are read only. Thus, in the embodiment of FIG. 5, each appliance may process CP or management commands whereby if the commands only read information from the MGT DB, the appliance uses its appliance local read-only replica of the MGT DB to service the command. Otherwise, if the commands write or modify information in the MGT DB, the appliance issues the appropriate requests and uses the primary MGT DB (that is read/write) of the primary appliance 201a to service the command.

In such an embodiment as in FIG. 5, the primary node 202a of the primary appliance 201a may receive a management or CP request and determine whether the request is RO with respect to information stored in the MGT DB. If the management or CP command is determined to be RO with respect to the MGT DB, the primary appliance 201a may use a load balancing technique to select one of the primary nodes 202a, 202c, 202e, 202g for servicing the command. Such primary nodes 202a, 202c, 202e, 202g in the embodiment of FIG. 5 are running, respectively, CP RO services 404a, 404c, 404e, 404g that perform read only queries using, respectively, the appliance local copies 310a-d of the MGT DB. In at least one embodiment, the load balancing technique may select one of the primary nodes having the minimum load of all the primary nodes. The primary node 202a may perform processing to determine whether the management or CP command otherwise writes to or modifies the MGT DB. If so, the primary appliance 201a may use a load balancing technique to select one of the peer non-primary nodes 202b, 202d, 202f, 202h for servicing the command. Such peer or non primary nodes 202b, 202d, 202f, 202h in the embodiment of FIG. 5 are running, respectively, CP RW services 404b, 404d, 404f, 404h that perform operations that modify or write to only the primary or active MGT DB 310a. In at least one embodiment, the load balancing technique may select one of the peer non primary nodes having the minimum load of all the primary nodes.

In some embodiments, all of the appliances in the federation may have the same CPU and memory resources. In this case, metrics used for load balancing may assume that the total amount of resources, such as CPU and memory, of the different nodes and appliances is the same. As a variation, in some embodiments the appliances of the federation may have different resource capabilities. In this case, metrics used for load balancing may take into account the varying amounts of resources of the different nodes and appliances. For example with reference to FIG. 5, assume that the appliance 201b as twice as many CPUs or CPU cores as the appliance 201c. For example, the appliance 201b may have 16 CPU cores reserved for use with the CP command processing, and the appliance 201c may have 8 CPU cores reserved for use with the CPU command processing. In this case, a CPU utilization metric may take into account the difference in CPU resources of the two appliances such as by normalizing the CPU utilizations of the appliances 201b-c. For example, the appliance 201b (and each node thereof) may have 50% CPU utilization for 16 CPU cores, and the appliance 201c (and each node thereof) may have 50% CPU utilization for 8 CPU cores. In this case, the CPU utilization metrics may be normalized to account for the difference in CPU resources. For example, the CPU utilization for the appliance 201b may be divided in half to 25% to scale down the utilization to match the 8 cores of the appliance 201c. In this case, the appliance 201b has a scaled CPU utilization of 25% to be compared to a CPU utilization of 50% for the appliance 201c with the 8 CPU cores.

In at least one embodiment when using a metric that measures the current load or workload of a node or appliance, the metric may take into account the varying resources capabilities of each such node or appliance. The resource capabilities may vary with the amount of CPU or memory or other resources configured into each appliance and its nodes. The resource capabilities may vary with the amount of CPU or memory or other resources allocated or reserved for use with management or CP command processing. Additionally, the resource capabilities of an appliance may vary dynamically depending on which node or nodes may be unavailable. For example, an appliance may have two nodes with 8 CPU cores on each node available for management or CP command processing. At one point in time, one of the two nodes is unavailable. In this case, the metric used to measure the current load of the appliance may be based on only 8 CPU cores since only one of its nodes is available. The one or more metrics used to measure the current load or workload of a node or appliance may take into any of the foregoing factors.

In accordance with the techniques herein, the federation level resource management (e.g., FRMs of the nodes of the federation) co-exists and cooperates with the local resource management (e.g., LRMs of each appliance) at the appliance level. This allows the federation level resource management components, such as the federation HA component and the FRMs 206a-h of the nodes 202a-h, to deploy the CP components across a logical federation or cluster of nodes, which is physically a federation of dual node storage appliances. In effect the set of nodes available to deploy the CP components is doubled, as compared, for example, to a configuration where only the primary node of each storage appliance is used for running all the CP components. However the dual node nature of each appliance continues to be recognized at the federation level. In embodiments in accordance with the techniques herein, rules may be configured in connection with federation level resource management (e.g., the FRMs of the nodes) enabling CP components to be configured in a distributed manner across nodes of each appliance where failure of any one node in the appliance results in the failed nodes CP components and other functionality failing over to run on the other remaining node in the same appliance.

The platform HA component of each appliance manages the HA of the two nodes within the appliance. The platform HA component, such as including the LRMs of the nodes of an appliance, decides which of the nodes of the appliance is the primary node and which is the non-primary peer node; and then passes such information on to federation HA component, such as to the FRMs of the nodes.

In some embodiments as described herein, the platform HA component of each appliance may deploy additional appliance-local resources only on the primary node. For example, the MGT DB may be mounted as a file system on the primary node of the appliance.

In some embodiments as described herein the platform HA component may notify the federation HA component when role of each node becomes primary or non-primary peer, either at reboot, or as part of node failover. Upon notification from the platform HA component, the federation HA component deploys and distributes instances of the CP components on that appliance, choosing the primary or the non-primary peer node based on the rules setup for each CP component. For example, in the embodiment described in connection with FIG. 4, there may be rule configured with the federation HA component to favor running all of the CP components denoted by 304b on the non-primary peer node of each appliance. Conversely the MGT DB server may have a deployment rule to favor running on the primary node.

In some embodiments as described herein, when one node in an appliance has failed, the federation HA component may be configured with rules to failover that node's resource instances to the surviving node, overriding resource preferences to run on the primary or non-primary peer node. In at least one embodiment, when the failed node recovers, rules may be specified to re-establish and setup the failed over components of the failed node back to the preferred primary or peer node.

When a failed node is in the current primary appliance, there may be additional rules configured with the federation HA component to failover the primary appliance role and associated CP resources to a different appliance. This assumes an available standby appliance with a quorum exists. For example if the primary node of the primary appliance fails, a replica instance of the management DB on a peer appliance may be promoted to be the new primary DB instance. In this manner in at least one embodiment, if the primary node of the primary appliance fails, rules at the federation level may provide for selecting another appliance as the primary appliance of the federation so that the primary appliance may have 2 available functioning nodes.

In an embodiment, any suitable technique may be used to select a primary appliance of the federation. For example, in at least one embodiment, a predetermined order or sequence may be used denoting a sequential order in which appliances are considered for promotion to the primary appliance role.

Quorum in a federation or cluster in an embodiment in accordance with the techniques herein may be based on the number of nodes or FRM instances at the federation level. The concept of quorum applies at the federation level when there is more than 1 appliance. In at least one embodiment having a federation of multiple appliances, a number of nodes able to communicate with one another is determined. The number of nodes able to communicate with one another must be more than 50% of the appliances in the federation in order to have quorum and continue servicing management or CP commands. For example, with reference to FIG. 5 where there are 8 nodes, quorum is met if the number nodes able to communicate with one another exceeds 4. If the number of nodes in communication with one another drops to 4 or less, quorum is not met and the federation may not service management or CP commands. However, I/Os on the I/O or data path may continue to be serviced independent of whether quorum is met or not.

Having node level voting for determining quorum has advantages as opposed to appliance level voting with one vote per appliance. In particular, node level voting with the distributed CP components across the nodes has advantages particularly with even-sized appliance federations. With node level voting for quorum, the number of viable configurations allowing the management or CP command processing to proceed is expanded. For example, consider a federation with 4 appliances of 8 nodes. Assume 3 nodes fail where each of the 3 failing nodes is in a different appliance. In this case there is still a total number of 5 nodes able to communicate and meet quorum. In contrast, consider a configuration of a federation with one vote per appliance with the 4 appliance federation. In this case, an appliance may be considered as failed if any one or more nodes of the appliance fail. Thus, the 3 failing nodes in 3 different appliances means that there is only ¼ or 25% participation by the voting members and quorum is not met.

Figure 6:
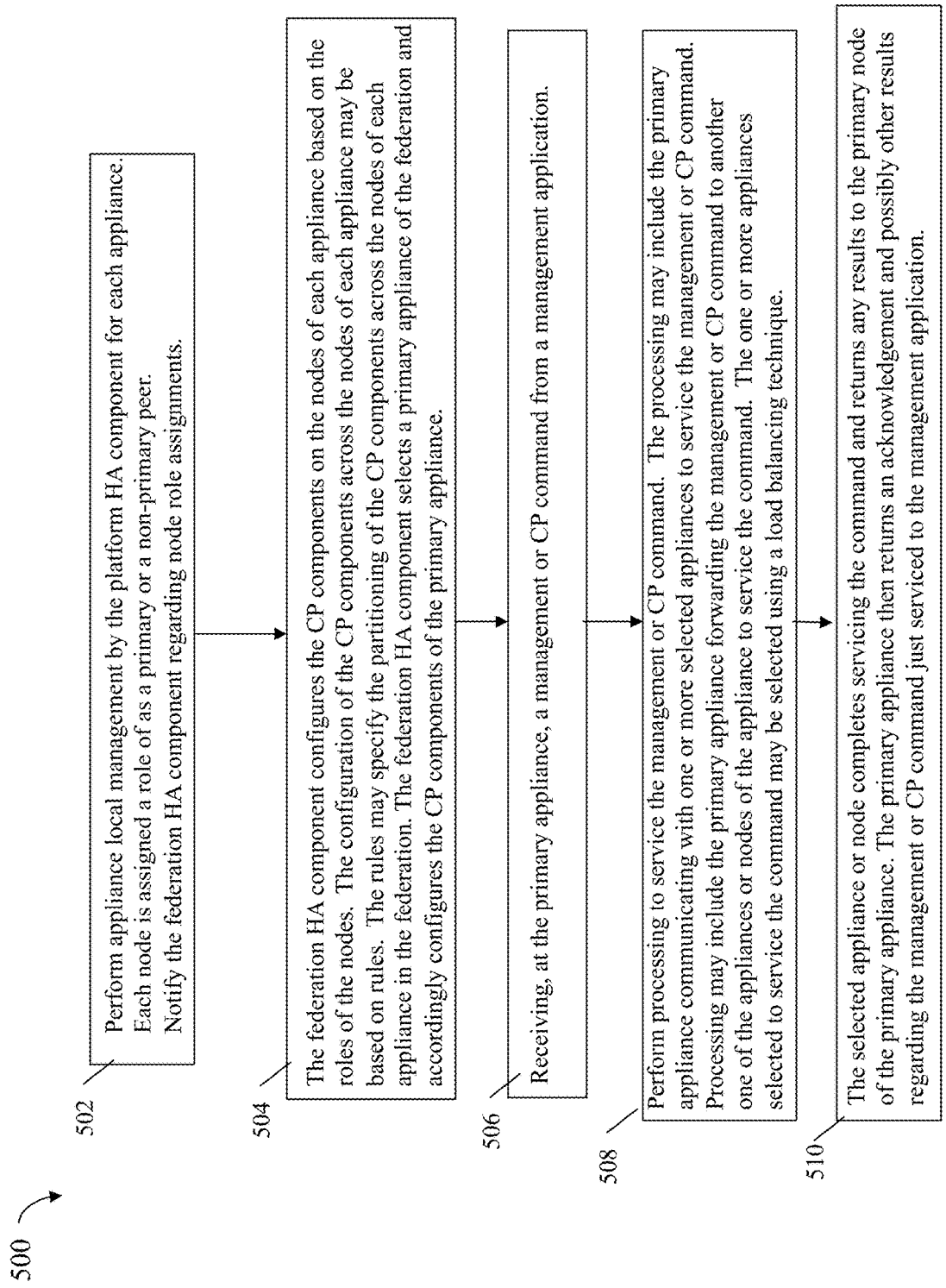
FIG. 6 is a flowchart of processing steps that may be performed in an embodiment in accordance with the techniques herein.

Referring to FIG. 6, shown is a flowchart 500 of processing steps that may be performed in an embodiment in accordance with the techniques herein. The flowchart 500 summarizes processing described above.

At a step 502, appliance local management may be performed for each of the appliances by the platform HA components of each appliance. The step 502 may include assigning a role to each node as a primary node or alternatively as a non-primary peer node. The step 502 may include notifying the federation HA component regarding the node role assignments. The step 502 may be performed, for example, as part of booting the appliances and the federation, and as part of node failover processing when a current primary node fails over to its peer node that is promoted to the new primary node. From the step 502, control proceeds to the step 504.

At the step 504, the federation HA component configures the CP components on the nodes of each appliance based on the roles of the nodes. The configuration of the CP components across the nodes of each appliance may be based on rules. The rules may specify the partitioning of the CP components across the nodes of each appliance in the federation. The federation HA component selects a primary appliance of the federation and accordingly configures the CP components of the primary appliance with any additions or variations from other non-primary peer appliances. For example, the step 504 may include assigning the global management IP address to the primary appliance, or more specifically, to the primary node of the primary appliance. The step 504 may include, for example, making the MGT DB on the primary appliance the primary active read-write copy. From the step 504, control proceeds to a step 506.

At the step 506, the primary appliance receives a management or CP command from a management application. From the step 506, control proceeds to the step 508.

At the step 508, processing is performed to service the management or CP command. The step 508 may include the primary appliance communicating with one or more selected appliances to service the management or CP command. The step 508 may include the primary appliance forwarding the management or CP command to another one of the appliances or nodes of the appliance to service the command. The one or more appliances selected to service the command may be selected by the primary appliance using a load balancing technique. From the step 508, control proceeds to a step 510.

At the step 510, the selected appliance or node completes servicing the command and returns any results to the primary node of the primary appliance. The primary appliance then returns an acknowledgement and possibly other results regarding the management or CP command just serviced to the management application. For example, if the management or CP command requested information about managed storage objects for display on the GUI of the management application, the results of one or more queries reading information from the MGT DB may be returned to the management application. As another example, if the management or CP command created a LUN (e.g., adding a new object or logical entity to the configuration), deleted a LUN (e.g., removing an object or logical entity from the configuration) or performing some other operation requiring modifications to the MGT DB, information returned may denote a status of the command as well as other information about any newly created object.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of configuring and processing control path commands comprising:
   partitioning control path components of a control path into a plurality of portions;
   performing first processing that configures a federation of a plurality of appliances, wherein each of the plurality of appliances includes a plurality of processing nodes, and wherein the first processing includes:
     for each of the plurality of appliances, configuring each of the plurality of processing nodes of said each appliance to run one portion of the plurality of portions of control path components; and
     selecting one of the plurality of appliances as a primary appliance of the federation;
   receiving a first management command at the primary appliance of the federation; and
   servicing the first management command by one or more of the plurality of appliances of the federation, wherein the control path components include a management database server that performs operations on a management database, wherein each of the plurality of appliances of the federation includes an instance of the management database server and a copy of the management database, wherein the copy of the management database on said primary appliance is readable and writable, wherein the instance of the management database server on the primary appliance is in a primary mode, wherein the copy of the management database on every other appliance of the federation other than said primary appliance is read only, and wherein, for each of the plurality of appliances of the federation, the copy of the management database of said each appliance includes data storage system configuration information of a data storage system, and wherein all management commands that are received by the primary appliance and require modification of at least some of the data storage system configuration information are serviced using the copy of the management database on the primary appliance.

2. The method of claim 1, wherein the first processing includes, for each of the plurality of appliances, selecting one of the plurality of nodes of said each appliance as a primary node of said each appliance.

3. The method of claim 2, wherein servicing the first management command includes the primary node of the primary appliance selecting the one or more of the plurality of appliances to service the first management command.

4. The method of claim 3, wherein servicing the first management command includes the primary node of the primary appliance forwarding the first management command to the primary node of a first appliance of the plurality of appliances.

5. The method of claim 1, wherein the first management command is issued over the control path from a management application to the primary appliance of the federation.

6. The method of claim 1, wherein the one or more of the plurality of appliances selected to service the first management command includes selecting a first of the plurality of appliances in accordance with a load balancing technique.

7. The method of claim 1, wherein the one or more of the plurality of appliances selected to service the first management command includes selecting a node of one of the appliances in accordance with a load balancing technique.

8. A method of configuring and processing control path commands comprising:
partitioning control path components of a control path into a plurality of portions;
performing first processing that configures a federation of a plurality of appliances, wherein each of the plurality of appliances includes a plurality of processing nodes, and wherein the first processing includes:
for each of the plurality of appliances, configuring each of the plurality of processing nodes of said each appliance to run one portion of the plurality of portions of control path components; and
selecting one of the plurality of appliances as a primary appliance of the federation;
receiving a first management command at the primary appliance of the federation; and
servicing the first management command by one or more of the plurality of appliances of the federation, wherein the control path components include a management database server that performs operations on a management database, wherein each of the plurality of appliances of the federation includes an instance of the management database server and a copy of the management database, wherein the copy of the management database on said primary appliance is readable and writable, wherein the instance of the management database server on the primary appliance is in a primary mode, wherein the copy of the management database on every other appliance of the federation other than said primary appliance is read only, wherein, for each of the plurality of appliances of the federation, the instance of the management database server is included in a first node of the plurality of nodes of said each appliance, and wherein, for each of the plurality of appliances of the federation, the management database of said each appliance is stored on physical storage devices accessible only to the plurality of nodes of said each appliance, and wherein the management database is mounted on the first node of said each appliance and is used, by the instance of the management database server on the first node, to process management database requests.

9. The method of claim 8, wherein the first node is the primary node of said each appliance.

10. The method of claim 8, wherein the control path components include first one or more components that process a first set of management commands issued over the control path, wherein each management command of the first set only reads information from the management database, and wherein the control path components include second one or more components that process a second set of management commands issued of the control path, wherein each management command of the second set includes modifying information of the management database.

11. The method of claim 10, wherein, for each of the plurality of appliances in the federation, the first one or more components are included on the first node of said each appliance, and wherein management commands of the first set are serviced by said each appliance by issuing one or more queries to the management database server of the first node of said each appliance to retrieve data from the management database of said each appliance.

12. The method of claim 11, wherein, for each of the plurality of appliances in the federation, the second one or more components are included on a second node of the plurality of nodes of said each appliance, and wherein management commands of the second set are serviced by said each appliance issuing one or more database commands to the management database server of the primary appliance, wherein the one more database commands modify content of the management database of the primary appliance.

13. A system comprising:
one or more processors; and
one or more memories comprising code stored thereon that, when executed, perform a method of configuring and processing control path commands comprising:
partitioning control path components of a control path into a plurality of portions;
performing first processing that configures a federation of a plurality of appliances, wherein each of the plurality of appliances includes a plurality of processing nodes, and wherein the first processing includes:
for each of the plurality of appliances, configuring each of the plurality of processing nodes of said each appliance to run one portion of the plurality of portions of control path components; and
selecting one of the plurality of appliances as a primary appliance of the federation;
receiving a first management command at the primary appliance of the federation; and
servicing the first management command by one or more of the plurality of appliances of the federation, wherein the control path components include a management database server that performs operations on a management database, wherein each of the plurality of appliances of the federation includes an instance of the management database server and a copy of the management database, wherein the copy of the management database on said primary appliance is readable and writable, wherein the instance of the management database server on the primary appliance is in a primary mode, wherein the copy of the management database on every other appliance of the federation other than said primary appliance is read only, and wherein, for each of the plurality of appliances of the federation, the copy of the management database of said each appliance includes data storage system configuration information of a data storage system, and wherein all management commands that are received by the primary appliance and require modification of at least some of the data storage system configuration information are serviced using the copy of the management database on the primary appliance.

14. A non-transitory computer readable medium comprising code stored thereon that, when executed, performs a method of configuring and processing control path commands comprising:
   partitioning control path components of a control path into a plurality of portions;
   performing first processing that configures a federation of a plurality of appliances, wherein each of the plurality of appliances includes a plurality of processing nodes, and wherein the first processing includes:
      for each of the plurality of appliances, configuring each of the plurality of processing nodes of said each appliance to run one portion of the plurality of portions of control path components; and
      selecting one of the plurality of appliances as a primary appliance of the federation;
   receiving a first management command at the primary appliance of the federation; and
   servicing the first management command by one or more of the plurality of appliances of the federation, wherein the control path components include a management database server that performs operations on a management database, wherein each of the plurality of appliances of the federation includes an instance of the management database server and a copy of the management database, wherein the copy of the management database on said primary appliance is readable and writable, wherein the instance of the management database server on the primary appliance is in a primary mode, wherein the copy of the management database on every other appliance of the federation other than said primary appliance is read only, and wherein, for each of the plurality of appliances of the federation, the copy of the management database of said each appliance includes data storage system configuration information of a data storage system, and wherein all management commands that are received by the primary appliance and require modification of at least some of the data storage system configuration information are serviced using the copy of the management database on the primary appliance.

15. The non-transitory computer readable medium of claim 14, wherein the first processing includes, for each of the plurality of appliances, selecting one of the plurality of nodes of said each appliance as a primary node of said each appliance.

16. The non-transitory computer readable medium of claim 15, wherein servicing the first management command includes the primary node of the primary appliance selecting the one or more of the plurality of appliances to service the first management command, and wherein servicing the first management command includes the primary node of the primary appliance forwarding the first management command to the primary node of a first appliance of the plurality of appliances.

17. A system comprising:
   one or more processors; and
   one or more memories comprising code stored thereon that, when executed, performs a method of configuring and processing control path commands comprising:
      partitioning control path components of a control path into a plurality of portions;
      performing first processing that configures a federation of a plurality of appliances, wherein each of the plurality of appliances includes a plurality of processing nodes, and wherein the first processing includes:
         for each of the plurality of appliances, configuring each of the plurality of processing nodes of said each appliance to run one portion of the plurality of portions of control path components; and
         selecting one of the plurality of appliances as a primary appliance of the federation;
      receiving a first management command at the primary appliance of the federation; and
      servicing the first management command by one or more of the plurality of appliances of the federation, wherein the control path components include a management database server that performs operations on a management database, wherein each of the plurality of appliances of the federation includes an instance of the management database server and a copy of the management database, wherein the copy of the management database on said primary appliance is readable and writable, wherein the instance of the management database server on the primary appliance is in a primary mode, wherein the copy of the management database on every other appliance of the federation other than said primary appliance is read only, wherein, for each of the plurality of appliances of the federation, the instance of the management database server is included in a first node of the plurality of nodes of said each appliance, and wherein, for each of the plurality of appliances of the federation, the management database of said each appliance is stored on physical storage devices accessible only to the plurality of nodes of said each appliance, and wherein the management database is mounted on the first node of said each appliance and is used, by the instance of the management database server on the first node, to process management database requests.

18. A non-transitory computer readable medium comprising code stored thereon that, when executed, performs a method of configuring and processing control path commands comprising:
   partitioning control path components of a control path into a plurality of portions;
   performing first processing that configures a federation of a plurality of appliances, wherein each of the plurality of appliances includes a plurality of processing nodes, and wherein the first processing includes:
      for each of the plurality of appliances, configuring each of the plurality of processing nodes of said each appliance to run one portion of the plurality of portions of control path components; and
      selecting one of the plurality of appliances as a primary appliance of the federation;

receiving a first management command at the primary appliance of the federation; and servicing the first management command by one or more of the plurality of appliances of the federation, wherein the control path components include a management database server that performs operations on a management database, wherein each of the plurality of appliances of the federation includes an instance of the management database server and a copy of the management database, wherein the copy of the management database on said primary appliance is readable and writable, wherein the instance of the management database server on the primary appliance is in a primary mode, wherein the copy of the management database on every other appliance of the federation other than said primary appliance is read only, wherein, for each of the plurality of appliances of the federation, the instance of the management database server is included in a first node of the plurality of nodes of said each appliance, and wherein, for each of the plurality of appliances of the federation, the management database of said each appliance is stored on physical storage devices accessible only to the plurality of nodes of said each appliance, and wherein the management database is mounted on the first node of said each appliance and is used, by the instance of the management database server on the first node, to process management database requests.

* * * * *